United States Patent
Yoshii

(10) Patent No.: US 12,157,227 B2
(45) Date of Patent: Dec. 3, 2024

(54) ROBOT CONTROL METHOD AND ROBOT SYSTEM

(71) Applicant: SEIKO EPSON CORPORATION, Tokyo (JP)

(72) Inventor: Koji Yoshii, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 267 days.

(21) Appl. No.: 17/585,602

(22) Filed: Jan. 27, 2022

(65) Prior Publication Data

US 2022/0241964 A1 Aug. 4, 2022

(30) Foreign Application Priority Data

Jan. 29, 2021 (JP) ................. 2021-012860

(51) Int. Cl.
*B25J 9/16* (2006.01)
*B25J 19/02* (2006.01)

(52) U.S. Cl.
CPC ............. *B25J 9/1633* (2013.01); *B25J 19/02* (2013.01)

(58) Field of Classification Search
CPC ........ B25J 9/1633; B25J 19/02; B25J 9/1612; B25J 13/085; B25J 15/0616; B25J 9/0093; B25J 9/1602; B25J 9/1694; G05B 2219/39514; G05B 2219/40599; G05B 19/4182; G05B 2219/45054; G05B 2219/39527; B65G 59/04; B07C 2501/0063; B07C 2501/0054; G01N 2021/845; G01N 2035/046

USPC ........................................................ 700/260
See application file for complete search history.

(56) References Cited

U.S. PATENT DOCUMENTS

| | | | |
|---|---|---|---|
| 2016/0083199 A1 | 3/2016 | Nishizaka et al. | |
| 2019/0344451 A1* | 11/2019 | Miyazawa | ............. B25J 9/1653 |
| 2019/0366544 A1 | 12/2019 | Oka et al. | |
| 2020/0282565 A1* | 9/2020 | Nakamoto | ............. B25J 9/1694 |
| 2021/0053216 A1* | 2/2021 | Diankov | ................. B25J 9/1669 |
| 2021/0237260 A1* | 8/2021 | Holopainen | ........... B25J 9/0051 |
| 2021/0237262 A1* | 8/2021 | Holopainen | ......... B25J 17/0225 |

FOREIGN PATENT DOCUMENTS

| | | |
|---|---|---|
| JP | 2003236786 A | 8/2003 |
| JP | 2007331056 A | 12/2007 |
| JP | 2015009308 A | 1/2015 |

(Continued)

OTHER PUBLICATIONS

1 Search Report of the First Office Action CN Application No. 2022100928359 issued Apr. 29, 2023.

*Primary Examiner* — Adam R Mott
*Assistant Examiner* — Joseph Anthony Trias
(74) *Attorney, Agent, or Firm* — Samson G. Yu

(57) ABSTRACT

A robot control method for controlling a robot is provided. The robot has a robot arm and a force detection unit detecting a force applied to the robot arm and grips a target object conveyed on a belt with an end effector provided at the robot arm. The method includes: a gripping step of executing an operation of gripping the target object with the end effector; and a determination step of determining whether the gripping of the target object is normally performed or not, based on a result of detection by the force detection unit in the gripping step.

6 Claims, 6 Drawing Sheets

(56) References Cited

FOREIGN PATENT DOCUMENTS

| JP | 2016060002 A | 4/2016 |
|---|---|---|
| JP | 2019209407 A | 12/2019 |
| JP | 2020040132 A | 3/2020 |
| JP | 2020203361 A | 12/2020 |

* cited by examiner

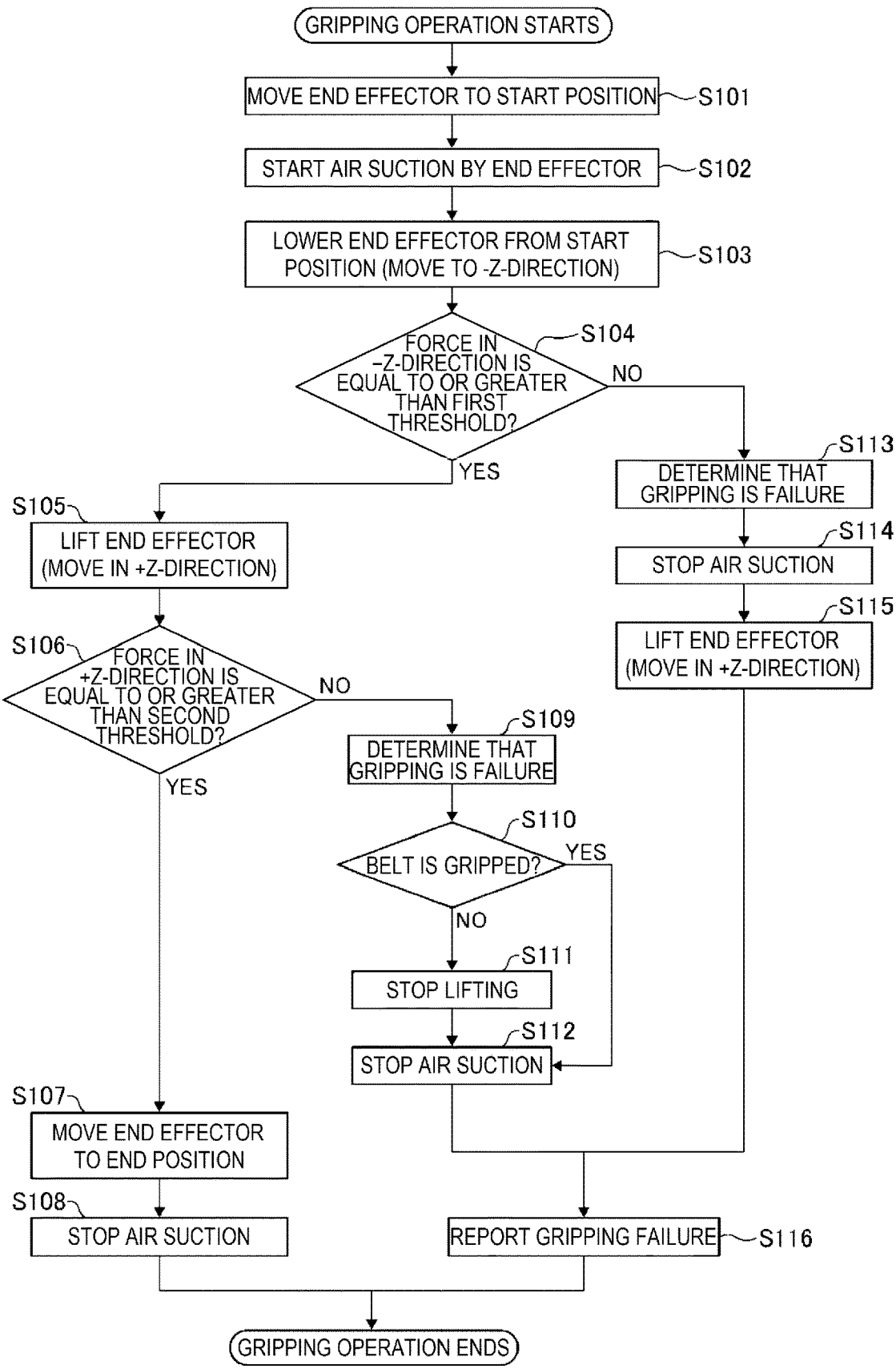

ROBOT CONTROL METHOD AND ROBOT SYSTEM

The present application is based on, and claims priority from JP Application Serial Number 2021-012860, filed Jan. 29, 2021, the disclosure of which is hereby incorporated by reference herein in its entirety.

BACKGROUND

1. Technical Field

The present disclosure relates to a robot control method and a robot system.

2. Related Art

Recently, due to a steep rise in labor costs and a shortage of skilled workers at plants, the use of various robots and robot peripheral devices has been accelerating the automation of tasks that have previously been handled manually. For example, a robot system described in JP-A-2016-60002 has a conveyor, a robot arm gripping a workpiece conveyed by the conveyor, and a control unit controlling the activation of the conveyor and the robot arm.

In such a robot system, when the robot fails in gripping the workpiece, for example, the robot arm may come into contact with a belt, which may affect the position of other workpieces, causing a problem in the subsequent tasks. Therefore, a method for accurately determining whether the gripping is successful or not is desired.

SUMMARY

A robot control method according to an aspect of the present disclosure is a robot control method for controlling a robot that has a robot arm and a force detection unit detecting a force applied to the robot arm and grips a target object conveyed on a belt with an end effector provided at the robot arm. The method includes: a gripping step of executing an operation of gripping the target object with the end effector; and a determination step of determining whether the gripping of the target object is normally performed or not, based on a result of detection by the force detection unit in the gripping step.

A robot system according to another aspect of the present disclosure includes: a robot having a robot arm and a force detection unit that detects a force applied to the robot arm; and a control unit controlling driving of the robot arm so as to grip a target object conveyed on a belt with an end effector provided at the robot arm. The control unit executes an operation of gripping the target object with the end effector, and determines whether the gripping of the target object is normally performed or not, based on a result of detection by the force detection unit.

BRIEF DESCRIPTION OF THE DRAWINGS

FIG. 10 is a flowchart for explaining an example of the robot control method according to the present disclosure.

DESCRIPTION OF EXEMPLARY EMBODIMENTS

The robot control method and the robot system according to the present disclosure will now be described in detail, based on a preferred embodiment illustrated in the accompanying drawings.

First Embodiment

Figure 1:
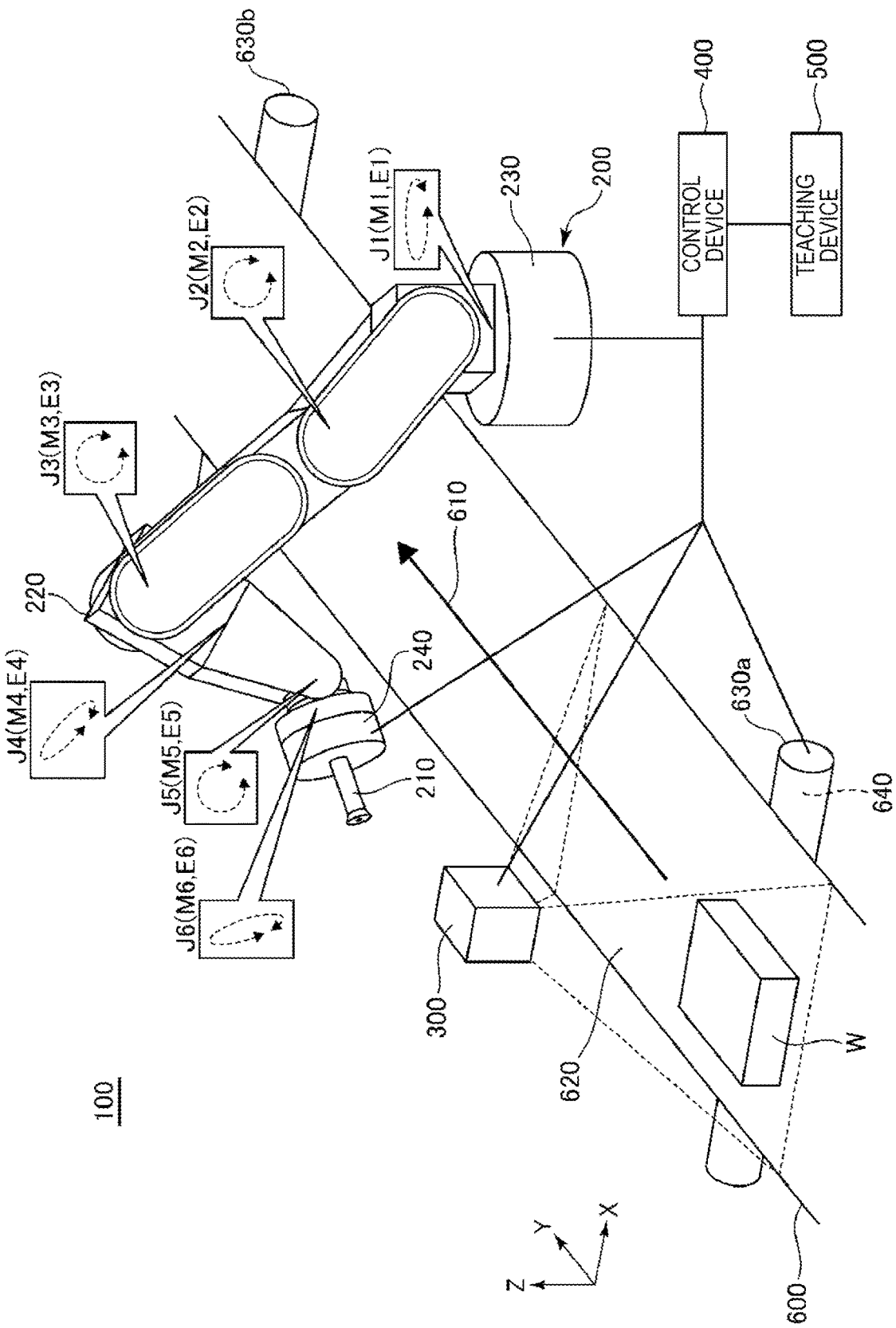
FIG. 1 shows a schematic configuration of a robot system.
Figure 6:
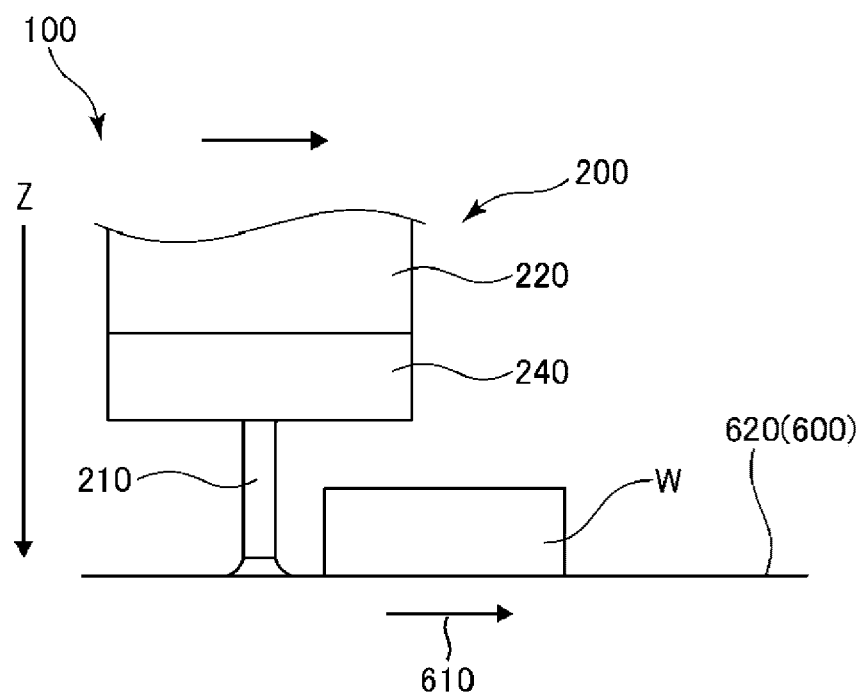
FIG. 6 is a side view for explaining a failure example of the gripping operation performed by the robot.
Figure 7:
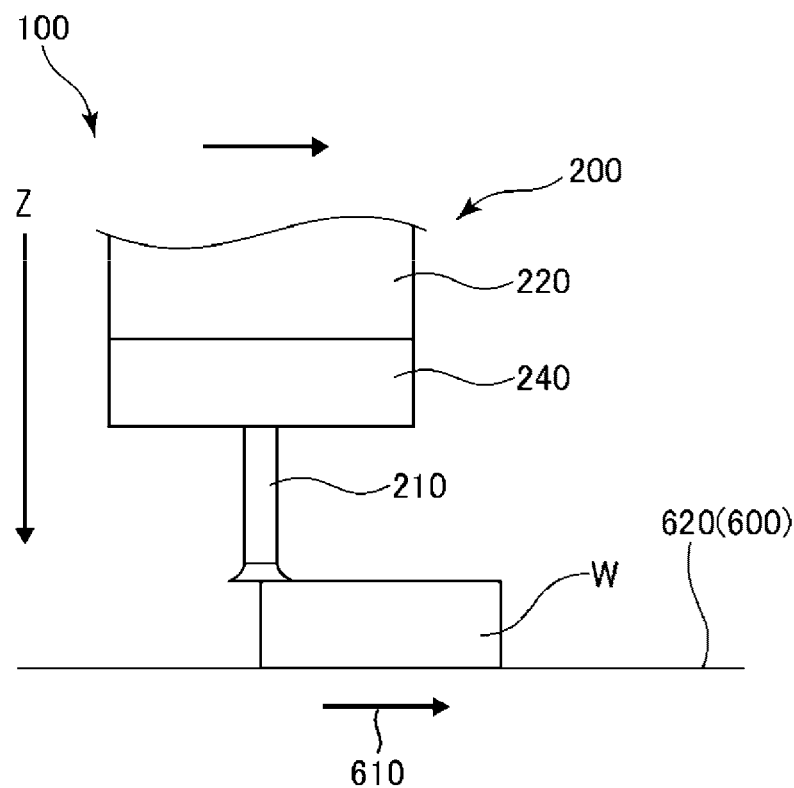
FIG. 7 is a side view for explaining a failure example of the gripping operation performed by the robot.
Figure 8:
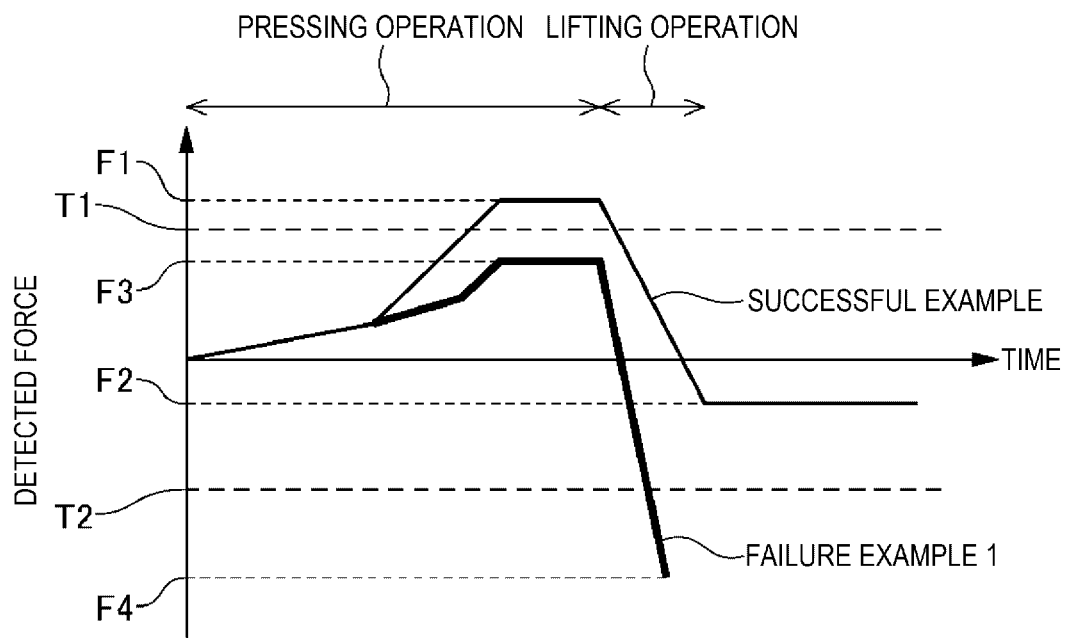
FIG. 8 is a graph for explaining the magnitude of a force detected by a robot arm in the gripping operation over time.
Figure 9:
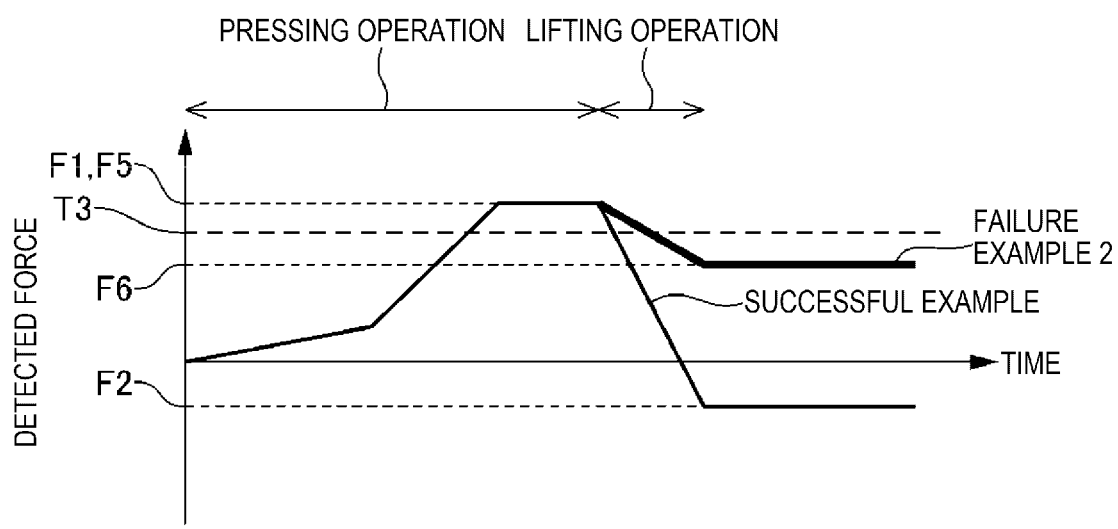
FIG. 9 is a graph for explaining the magnitude of a force detected by the robot arm in the gripping operation over time.

FIG. 1 shows a schematic configuration of a robot system. FIGS. 2 to 5 are side views for explaining a successful example of a gripping operation performed by a robot. FIGS. 6 and 7 are side views for explaining a failure example of the gripping operation performed by the robot. FIGS. 8 and 9 are graphs for explaining the magnitude of a force detected by a robot arm in the gripping operation over time. FIG. 10 is a flowchart for explaining an example of the robot control method according to the present disclosure.

In FIG. 1, for the sake of convenience of the description, an X-axis, a Y-axis, and a Z-axis are shown as three axes orthogonal to each other. In the description below, a direction parallel to the X-axis is referred to as an "X-axis direction". A direction parallel to the Y-axis is referred to as a "Y-axis direction". A direction parallel to the Z-axis is referred to as a "Z-axis direction".

In the description below, the Z-axis direction in FIG. 1, that is, the up-down direction, is defined as a "vertical direction", and the X-axis direction and the Y-axis direction are defined as "horizontal directions".

A robot 200 has a base 230 fixed to a floor, a robot arm 220 supported by the base 230, and an end effector 210 supported by the robot arm 220. The robot arm 220 is formed of a plurality of arms coupled together in such a way as to be rotationally movable. In this embodiment, the robot arm 220 is a 6-axis arm having six joints J1 to J6. Of these joints, the joints J2, J3, J5 are bending joints and the joints J1, J4, J6 are torsion joints.

Motors M1, M2, M3, M4, M5, M6 and encoders E1, E2, E3, E4, E5, E6 are installed at the joints J1, J2, J3, J4, J5, J6, respectively. A control device 400 executes feedback control so that the angles of rotation of the joints J1 to J6 indicated by outputs from the encoders E1 to E6 coincide target angles of rotation, which are control targets, during the operation of a robot system 100. Thus, each of the joints J1 to J6 can be kept at the target angle of rotation and the robot arm 220 can be placed in a desired position and attitude. Therefore, the robot 200 can be stably driven in a desired operation.

The end effector 210 is installed at a distal end part of the robot arm 220, that is, at the joint J6, via a mechanical interface. The end effector 210 has a suction hole, a flow path communicating with the suction hole, and a suction source generating a negative pressure in the flow path, though not illustrated. The activation of the suction source is controlled by the control device 400. Thus, suction can be performed to suck and grip a workpiece W at a desired timing and the suction can be cancelled to release the gripped workpiece W at a desired timing.

The end effector 210 is not limited to the above configuration and may be configured, for example, to grip the workpiece W with a plurality of claws or the like. In this embodiment, the end effector 210 may or may not be a component of the robot 200.

At the joint J6 of the robot arm 220, a force detection unit 240 acquiring information about an acting force acting on the workpiece W from the end effector 210 is installed. The force detection unit 240 measures forces along the three axes and torques about the three axes that act on the workpiece W, in a sensor coordinate system, which is a unique three-dimensional orthogonal coordinate system.

The force detection unit 240 is formed of a quartz crystal force sensor. The quartz crystal force sensor is, for example, a 6-axis force sensor that can detect 6-axis components of an external force. The 6-axis components are made up of translational force components in the directions of an α-axis, a β-axis, and a γ-axis, which are three axes orthogonal to each other, and rotational force components about these three axes.

The quartz crystal force sensor has a casing and a plurality of quartz crystal piezoelectric elements arranged inside the casing, though not illustrated. The quartz crystal force sensor outputs detection signals corresponding to external forces received by the respective sensor elements and processes these detection signals. The quartz crystal force sensor can thus detect 6-axis components of an external force applied to the force detection unit 240 and detect the extent of the external force, based on the detected 6-axis components.

In this way, the force detection unit 240 has the quartz crystal force sensor. Thus, the force detection unit 240 having excellent characteristics such as a high sensitivity, a broad dynamic range, and a high rigidity can be provided. This enables accurate detection of a force applied to the robot arm 220.

The sensor element may be configured using a piezoelectric material other than quartz crystal. The piezoelectric material other than quartz crystal may be, for example, topaz, barium titanate, lead titanate, lead zirconate titanate (PZT), lithium niobate, lithium tantalate, or the like.

The site where the force detection unit 240 is installed is not particularly limited. The force detection unit 240 may be installed at the other joints J1 to J5.

A conveyor device 600 is a belt conveyor in which the direction of width is the X-axis direction and which feeds the workpiece W in the Y-axis direction. The conveyor device 600 has a belt 620 and conveyor rollers 630a, 630b feeding the belt 620. In this embodiment, a direction of conveyance 610 of the conveyor device 600 is a direction from the −Y-axis side to the +Y-axis side. However, the conveyor device 600 is not limited to a belt conveyor and may be any device that can convey the workpiece W along the direction of conveyance 610.

The conveyor device 600 moves a conveyance surface by the conveyor rollers 630a, 630b and thus conveys the workpiece W placed on the conveyance surface in the direction of conveyance 610. The conveyor roller 630a is provided with an amount-of-conveyance sensor 640 outputting a signal corresponding to the amount of rotation of the conveyor roller 630a to the control device 400. The control device 400 executes feedback control so that the speed of conveyance of the workpiece W indicated by the output from the amount-of-conveyance sensor 640 coincides with a target speed of conveyance, which is a control target, during the operation of the robot system 100. Thus, the speed of conveyance of the workpiece W can be kept at the target speed of conveyance and the workpiece W can be stably conveyed at a desired speed.

A position sensor 300 detects the position of the workpiece W from above the conveyor device 600. The position sensor 300 is a camera outputting an image of the workpiece W to the control device 400. However, the position sensor 300 is not limited to a camera. For example, a laser range scanner or the like may be employed. The position sensor 300 has an angle of view including the workpiece W conveyed on the belt 620, as indicated by a dashed line in FIG. 1. A position in the image outputted from the position sensor 300 is associated with a position in a conveyance path by the control device 400. Therefore, when the workpiece W exists within the angle of view of the position sensor 300, the coordinates of the workpiece W can be specified, based on the position of the workpiece W in the image from the position sensor 300.

The control device 400 controls the driving of the robot 200, the position sensor 300, and the conveyor device 600. Such a control device 400 has, for example, a processor (CPU) formed of a computer and processing information, a memory communicatively coupled to the processor, and an external interface for coupling to an external device. Various programs executable by the processor are saved in the memory. The processor can read and execute various programs or the like stored in the memory. A part of all of the components of the control device 400 may be arranged inside the casing of the robot 200. The control device 400 may also be formed of a plurality of processors.

The control device 400 drives the robot arm 220, for example, in such a way that the end effector 210 follows, at an equal speed, the workpiece W conveyed by the conveyor device 600, based on the result of detection by the position sensor 300. Thus, the task of gripping or releasing can be performed while the positional relationship in the Y-axis direction between the end effector 210 and the workpiece W is regulated.

A teaching device 500 is a device for a user to input an operation program by direct teaching or indirect teaching. The teaching device 500 has, for example, a processor (CPU) of a computer and processing information, a memory communicatively coupled to the processor, and an external interface for coupling to an external device. The operation program inputted by the worker is stored in the memory and transmitted to the control device 400 via the external interface.

A successful example and failure examples of the gripping operation performed by the robot 200 will now be described. FIGS. 8 and 9 show the transition of a force detected by the force detection unit 240 over time in the successful example and the failure examples.

In the description below, only a lifting operation in the Z-axis direction in the state where feedback control is executed so that the speed of conveyance of the workpiece W indicated by the output from the amount-of-conveyance sensor 640 coincides with the target speed of conveyance, which is a control target, will be described.

First, a successful example of the gripping operation will be described.

Figure 2:
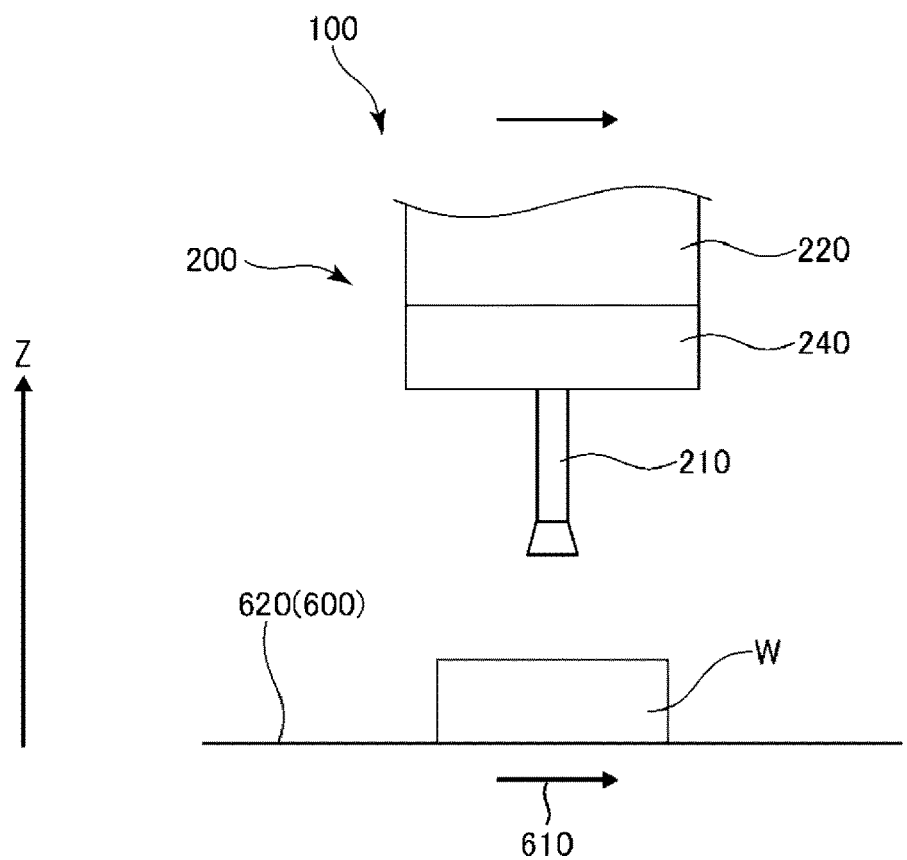
FIG. 2 is a side view for explaining a successful example of a gripping operation performed by a robot.
Figure 3:
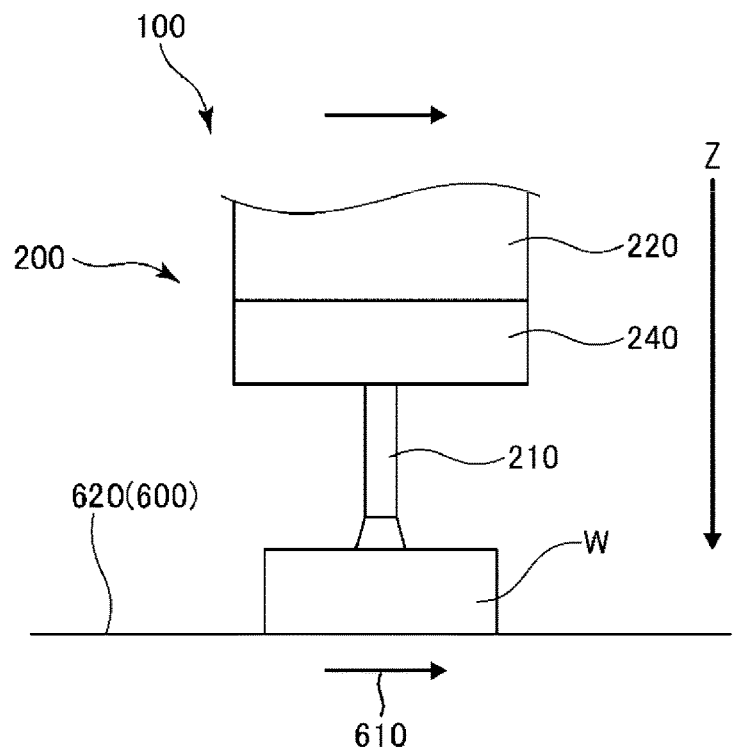
FIG. 3 is a side view for explaining the successful example of the gripping operation performed by the robot.

From the state where the end effector 210 is located to the +Z-axis side of the workpiece W as shown in FIG. 2, the end effector 210 is moved to the −Z-axis side, that is, lowered, so that the end effector 210 approaches the workpiece W as shown in FIG. 3.

When the end effector 210 is lowered and is pressed against the workpiece W, a force detected by the force detection unit 240, that is, a reaction force received from the workpiece W, increases, as shown in FIGS. 8 and 9. In this case, the maximum value of the magnitude of the force detected by the force detection unit 240 is defined as a force F1.

Figure 4:
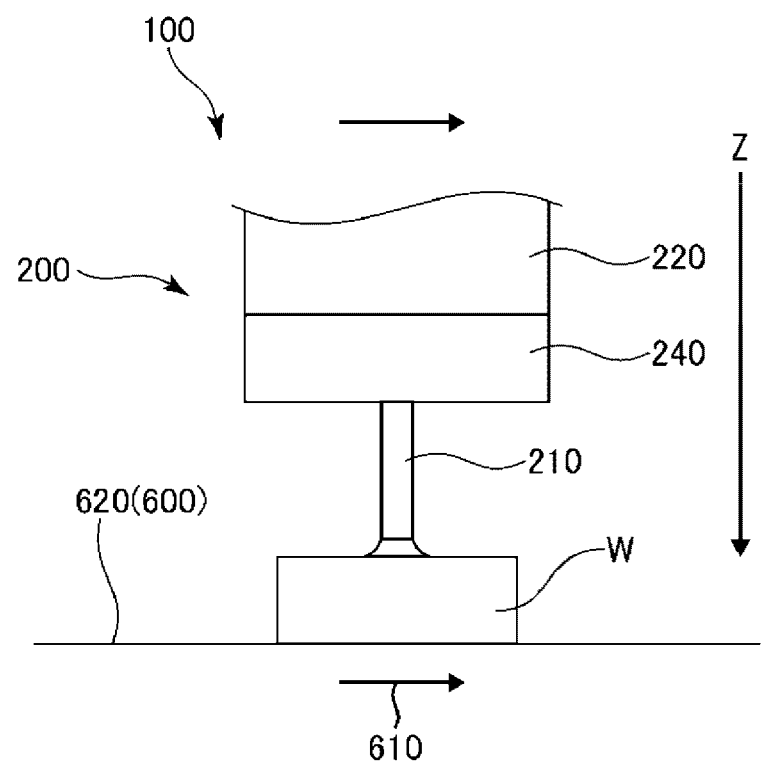
FIG. 4 is a side view for explaining the successful example of the gripping operation performed by the robot.

In this embodiment, air suction by the end effector 210 is started from the state shown in FIG. 2. Then, the end effector 210 is pressed against the workpiece W, as shown in FIG. 4. Thus, a distal end part of the end effector 210 comes into tight contact with the upper surface of the workpiece W, creating a state where the end effector 210 is gripping the workpiece W.

Figure 5:
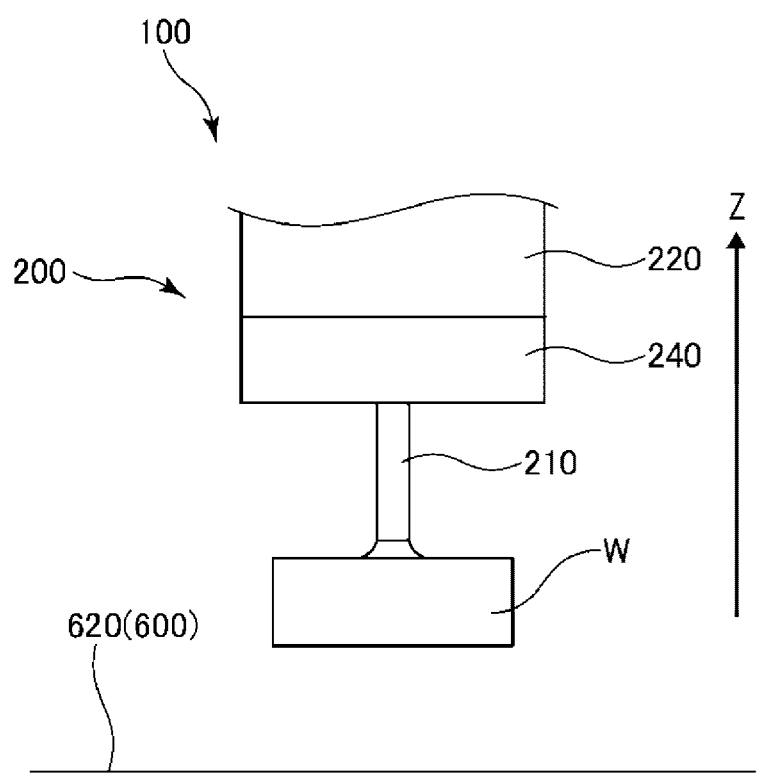
FIG. 5 is a side view for explaining the successful example of the gripping operation performed by the robot.

Next, the robot arm 220 is driven in such a way that the end effector 210 is moved to the +Z-axis side, that is, the end effector 210 is lifted, as shown in FIG. 5. Thus, the force pulling the end effector 210 in the −Z-axis direction increases, as shown in FIGS. 8 and 9.

The maximum value of the force detected by the force detection unit 240, that is, the force pulling in the −Z-axis direction, when the workpiece W is lifted, that is, in the state shown in FIG. 5, is defined as a force F2, as shown in FIG. 8.

In this way, when gripping the workpiece W, the pressing operation of lowering the end effector 210 and pressing the end effector 210 against the workpiece W, and the lifting operation of lifting the end effector 210, are sequentially executed.

A failure example of the gripping operation will now be described.

The failure example may be, for example, the state shown in FIG. 6, the state shown in FIG. 7, or the like.

In the state shown in FIG. 6, the end effector 210 is pressed against the belt 620 in the pressing operation. The maximum value of the force detected by the force detection unit 240 in the pressing operation is smaller than the force F1 detected by the force detection unit 240 in the successful example. The maximum value of the force detected by the force detection unit 240 in the state shown in FIG. 6 is defined as a force F3, as shown in FIG. 8. In this case, the force detected by the force detection unit 240 makes a transition as shown in FIG. 8.

When the lifting operation is performed in this state, the end effector 210 is to lift the belt 620 and therefore a force F4 detected by the force detection unit 240 is greater than the force F2 detected when the end effector 210 lifts the workpiece W, as shown in FIG. 8.

In the state shown in FIG. 7, the end effector 210 is pressed against an edge of the workpiece W in the pressing operation. In this case, the force detected by the force detection unit 240 makes a transition as shown in FIG. 9. The maximum value of the magnitude of the force detected by the force detection unit 240 in the pressing operation is a force F5 substantially equivalent to the force F1, as shown in FIG. 9.

When the lifting operation is performed in this state, the workpiece W cannot be lifted and therefore the maximum value of the force detected by the force detection unit 240 is smaller than the force F2 detected when the workpiece W is lifted, as shown in FIG. 9. The maximum value of the force detected by the force detection unit 240 in the state shown in FIG. 7 is defined as a force F6, as shown in FIG. 9.

Such forces F1 to F4 are set, for example, by executing the operations as described above when the worker gives a teaching, and storing the result of detection by the force detection unit 240 in each operation. Based on these forces F1 to F4, a first threshold T and a second threshold T2, described later, are set.

As for the forces F5, F6, in addition to the forces F1 to 4, the failure example may be experimentally executed in advance and the resulting forces may be stored.

The robot control method according to the present disclosure will now be described with reference to the flowchart shown in FIG. 10.

First, in step S101, the end effector 210 is moved to a start position. That is, the state where the end effector 210 is spaced apart from the workpiece W by a predetermined distance along the Z-axis direction is maintained while the end effector 210 is following the moving workpiece W.

Next, in step S102, air suction by the end effector 210 is started.

Next, in step S103, the end effector 210 is lowered from the start position. That is, the foregoing pressing operation is performed. This step S103 is a gripping step of executing an operation of gripping the workpiece W with the end effector 210.

Next, in step S104, whether the force in the −Z-axis direction is equal to or greater than the first threshold T1 or not is determined. That is, whether the force F1 applied to the robot arm 220 is equal to or greater than the first threshold T1 or not is determined. The first threshold T1 is, for example, a value that is set based on the force F1 when a teaching is given, for example, a value smaller than the force F1 by a predetermined value. The first threshold T1 is stored in the memory of the control device 400 in advance.

Such a step S104 is a determination step of determining whether the gripping of the workpiece W is normally performed or not.

For example, in the case of the normal gripping operation as shown in FIG. 5, T1<F1 holds, as shown in FIG. 8. Therefore, it is determined that the gripping operation is normally performed, and the processing shifts to step S105. In the failure example 2 shown in FIG. 7, the processing similarly shifts to step S105. This step S105 is a gripping step of executing an operation of gripping the workpiece W with the end effector 210.

Meanwhile, for example, when the end effector 210 grips an object that is less thick than the workpiece W, that is, an object having a lower height in the Z-axis direction than the workpiece W, the detected force is smaller than the first threshold T1. Therefore, it is determined that there is an abnormality, and the processing shifts to step S113.

Next, in step S105, the end effector 210 is lifted while the air suction is continued. That is, a lifting operation of lifting the workpiece W is performed. Thus, the workpiece W can be lifted, as shown in FIG. 5.

Next, in step S106, whether the force applied in the +Z-axis direction is equal to or greater than the second threshold T2 or not is determined. That is, whether the force F2 in the −Z-axis direction applied to the robot arm 220 is equal to or greater than the second threshold T2 or not is determined. The second threshold T2 is, for example, a value that is set based on the force F2 when a teaching is given, for example, a value smaller than the force F2 by a predetermined value. The second threshold T2 is stored in the memory of the control device 400 in advance.

Such a step S106 is a determination step of determining whether the gripping of the workpiece W is normally performed or not.

For example, in the case of the normal gripping operation as shown in FIG. 5, T2<F2 holds, as shown in FIG. 8. Therefore, it is determined that the gripping operation is normally performed. In step S107, the end effector 210 is moved to an end position, that is, releases the gripped workpiece W and completes the movement of the workpiece W. Then, in step S108, the air suction is stopped.

Meanwhile, when it is determined in step S106 that the force applied in the +Z-axis direction is not equal to or greater than the second threshold T2, it is then determined in step S109 that the gripping is a failure. Next, in step S110, whether the belt 620 is gripped or not is determined.

The determination in step S110 is performed, based on whether the force F5 pulling in the –Z-direction exceeds a third threshold T3 or not. The third threshold T3 is a value that is set to be greater by a predetermined value than the force F5 acquired in the teaching operation. The third threshold T3 is stored in the memory of the control device 400 in advance.

When it is determined in step S110 that the belt 620 is gripped, the lifting operation is stopped in step S111 and the air suction is stopped in step S112. That is, the lifting operation of the end effector 210 is immediately stopped and subsequently the gripped workpiece W is released. Thus, damage to the robot arm 220 or the conveyor device 600 due to the lifting of the belt 620 can be prevented. Such a step S112 is a release step of executing an operation of releasing the gripped workpiece W.

Then, the air suction is stopped and the gripping failure is reported in step S116. The way of this reporting is not particularly limited. For example, the reporting may be performed by displaying a warning screen on a monitor, not illustrated, that is provided in the control device 400 or the teaching device 500, by emitting light from a lamp or the like, or by outputting a sound from a speaker, or the like.

Meanwhile, when it is determined in step S110 that the belt 620 is not gripped, that is, for example, that an edge of the workpiece W is gripped, as shown in FIG. 7, the air suction is stopped in step S112 and the gripping failure is reported in step S116. Such a step S116 is a reporting step of reporting that the gripping of the workpiece W is not normally performed.

When it is determined in step S104 that there is an abnormality, it is then determined in step S113 that the gripping is a failure, and the air suction is stopped in step S114. Then, the end effector 210 is lifted. Such a step S114 is a release step of executing an operation of releasing the gripped workpiece W.

As described above, the robot control method according to the present disclosure is a control method for controlling a robot that has the robot arm 220 and the force detection unit detecting a force applied to the robot arm 220 and that grips the workpiece W as a target object conveyed on the belt 620 with the end effector 210 provided at the robot arm 220. The method includes: the gripping step of executing the operation of gripping the workpiece W as the target object with the end effector 210; and the determination step of determining whether the gripping of the workpiece W is normally performed or not, based on the result of detection by the force detection unit 240 in the gripping step. Thus, more accurate determination can be performed than when determining whether the gripping is normally performed or not, for example, based on a change in suction force. Particularly, the extent of drop in suction force is substantially the same between when the workpiece W is sucked and when the belt 620 is sucked. Therefore, when determining whether the gripping is normally performed or not, based on a change in suction force, it is difficult to specify the type of the failure. In contrast, according to the present disclosure, the type of the gripping failure can be specified, as described above. Therefore, the subsequent operation of the robot arm 220 and the timing of releasing the gripped workpiece W by the end effector 210 can be properly executed.

The robot system 100 according to the present disclosure includes: the robot 200 having the robot arm 220 and the force detection unit 240 that detects a force applied to the robot arm 220; and the control device 400 as a control unit controlling the driving of the robot arm 220 so as to grip the workpiece W as a target object conveyed on the belt 620 with the end effector 210 provided at the robot arm 220. The control device 400 executes the operation of gripping the workpiece W with the end effector 210, and determines whether the gripping of the workpiece W is normally performed or not, based on the result of detection by the force detection unit 240. Thus, more accurate determination can be performed than when determining whether the gripping is normally performed or not, for example, based on a change in suction force.

The end effector 210 is configured to grip the workpiece W as the target object by suction. In the gripping step, the pressing operation of lowering the end effector 210 and pressing the end effector 210 against the workpiece W while performing the suction, and the lifting operation of lifting the end effector 210 while performing the suction after the pressing operation, are sequentially executed. Thus, the end effector 210 can accurately grip the workpiece W.

In the determination step, when the maximum value of the force detected by the force detection unit 240 in the pressing operation is less than the first threshold T1, it is determined that the gripping of the workpiece W is not normally performed. Thus, for example, whether the workpiece W is gripped or a different workpiece is gripped can be understood. Therefore, the robot arm 220 can subsequently be made to perform a proper operation as described above.

In the determination step, when the magnitude of the force detected by the force detection unit 240 in the lifting operation is less than the second threshold T2, it is determined that the gripping of the workpiece W is not normally performed. Thus, whether the end effector 210 has gripped the workpiece W or the belt 620 can be understood.

The method also includes the release step of executing the operation of releasing the gripped workpiece W when it is determined in the determination step that the gripping of the workpiece W as the target object is not normally performed. In the release step, the timing of releasing the gripped workpiece W is made different between when it is determined that the gripping of the workpiece W is not normally performed in the pressing operation and when it is determined that the gripping of the workpiece W is not normally performed in the lifting operation. Thus, the robot arm 220 can be made to perform a proper operation corresponding to the type of the failure.

The method also includes the reporting step of reporting that the gripping of the workpiece W is not normally performed when it is determined in the determination step that the gripping of the workpiece W is not normally performed. Thus, the worker can understand the gripping failure. Therefore, the worker can, for example, check the working environment of the robot 200 and then set the normal working environment again.

The robot control method and the robot system according to the present disclosure have been described above, based on the illustrated embodiment. However, the present disclosure is not limited to this embodiment. Each step or structure can be replaced with any step or structure having a similar function. Also, any step or structure may be added.

The configuration in which the maximum value of the detected force is compared with the threshold to determine whether the gripping of the workpiece is normally performed or not, as in the above embodiment, is not limiting. For example, a configuration in which the force applied to the robot arm is compared in real time with the result of detection acquired over time in the gripping step, may be employed. That is, the determination step may be configured to perform determination based on information about the force detected over time by the force detection unit. In this case, it can be determined that the gripping of the workpiece is not normally performed, for example, when the extent of the discrepancy in the result of the comparison is equal to or higher than a predetermined level.

What is claimed is:

1. A robot control method for controlling a robot that has a robot arm and a force detection unit detecting a force applied to the robot arm and that grips a target object conveyed on a belt with an end effector provided at the robot arm, the method comprising:
a gripping step of executing an operation of gripping the target object with the end effector; and
a determination step of determining whether the gripping of the target object is normally performed or not, based on a result of detection by the force detection unit in the gripping step, wherein when the gripping of the target object is normally performed, the end effector grips a surface of the target object rather than edge of the surface of the target object or the belt,
wherein
the end effector is configured to grip the target object by suction, and
in the gripping step, a pressing operation of lowering the end effector and pressing the end effector against the target object while performing the suction, and a lifting operation of lifting the end effector while performing the suction after the pressing operation, are sequentially executed,
in the determination step, when a maximum value of a force detected by the force detection unit in the pressing operation is less than a first threshold, it is determined that the gripping of the target object is not normally performed,
in the determination step, when a magnitude of a force detected by the force detection unit in the lifting operation is less than a second threshold, it is determined that the gripping of the target object is not normally performed.

2. The robot control method according to claim 1, further comprising:
a release step of executing an operation of releasing the gripped target object when it is determined in the determination step that the gripping of the target object is not normally performed, wherein
in the release step, a timing of releasing the gripped target object is made different between when it is determined that the gripping of the target object is not normally performed in the pressing operation and when it is determined that the gripping of the target object is not normally performed in the lifting operation.

3. The robot control method according to claim 1, further comprising:
a reporting step of reporting that the gripping of the target object is not normally performed when it is determined in the determination step that the gripping of the target object is not normally performed.

4. The robot control method according to claim 1, wherein in the determination step, the determination is performed based on information about a force detected over time by the force detection unit.

5. The robot control method according to claim 1, wherein the force detection unit has a quartz crystal force sensor.

6. A robot system comprising:
a robot having a robot arm and a force detection unit that detects a force applied to the robot arm; and
a control unit controlling driving of the robot arm so as to grip a target object conveyed on a belt with an end effector provided at the robot arm, wherein
the control unit executes an operation of gripping the target object with the end effector, and
determines whether the gripping of the target object is normally performed or not, based on a result of detection by the force detection unit, wherein when the gripping of the target object is normally performed, the end effector grips a surface of the target object rather than edge of the surface of the target object or the belt,
wherein
the end effector is configured to grip the target object by suction, and
in the gripping, a pressing operation of lowering the end effector and pressing the end effector against the target object while performing the suction, and a lifting operation of lifting the end effector while performing the suction after the pressing operation, are sequentially executed,
in the determining, when a maximum value of a force detected by the force detection unit in the pressing operation is less than a first threshold, it is determined that the gripping of the target object is not normally performed,
in the determining, when a magnitude of a force detected by the force detection unit in the lifting operation is less than a second threshold, it is determined that the gripping of the target object is not normally performed.

* * * * *